(12) United States Patent
Dykes (10) Patent No.: US 6,487,058 B1
(45) Date of Patent: Nov. 26, 2002

(54) ESD SHUNT

(75) Inventor: John W. Dykes, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/585,922

(22) Filed: Jun. 2, 2000

Related U.S. Application Data
(60) Provisional application No. 60/175,267, filed on Jan. 10, 2000.

(51) Int. Cl.⁷ .................................................. H02H 9/00
(52) U.S. Cl. ............................ 361/56; 361/58; 361/111; 361/118
(58) Field of Search ............................... 361/56, 58, 111, 361/117, 118, 119

(56) References Cited

U.S. PATENT DOCUMENTS

| | | | |
|---|---|---|---|
| 3,857,161 A | 12/1974 | Hutchins, IV | 29/472.7 |
| 4,201,649 A | 5/1980 | Gillery | 204/192 P |
| 5,197,653 A | 3/1993 | Beckwith et al. | 228/116 |
| 5,232,091 A * | 8/1993 | Hennessy et al. | 206/331 |
| 5,506,707 A | 4/1996 | Segawa | 359/87 |
| 5,729,438 A * | 3/1998 | Pieper et al. | 361/760 |

* cited by examiner

*Primary Examiner*—Stephen W. Jackson
(74) *Attorney, Agent, or Firm*—Mitchell K. McCarthy (57) ABSTRACT

A method for placing several electrical portions of an electrical component at substantially the same electrical potential includes identifying electrical conductors which lead to a first electrical portion and separate electrical conductors which lead to a second electrical portion. Indium metal is placed across the leads of the first electrical portion and the leads of the second electrical portion. An indium metal wire may be placed across the leads of the first electrical portion and the leads of the second electrical portion. A sheet of indium metal foil may also be placed across the leads of the first electrical portion and the leads of the second electrical portion. The indium metal, in either the wire form or the sheet form, is pressed across the leads of the first electrical portion and the leads of the second electrical portion. The indium metal material may be doped to porduce a static dissipative material.

13 Claims, 6 Drawing Sheets

ESD SHUNT

RELATED APPLICATION

This application claims the benefit of U.S. Provisional Application Ser. No. 60/175,267, filed Jan. 10, 2000 under 35 U.S.C. 119(e).

FIELD OF THE INVENTION

The present invention relates generally to the field of grounding or maintaining parts of sensitive electrical components at substantially the same potential. More particularly, this invention relates to a shunt or jumper for connecting pins or other electrical connectors in a sensitive electrical component.

BACKGROUND OF THE INVENTION

Electrostatic discharge ("ESD") is a large problem in sensitive electrical devices. Electrostatic discharge can and will damage sensitive electrical devices. There is a long list of sensitive electrical devices that are used and manufactured each day. Microchips and microprocessors are just two classes of devices which may be ESD sensitive. A constant goal of microchip manufacturers is to miniturize the device. Some microprocessors have in excess of 10,000,000 devices on a single chip. The miniaturization of electronic components in semiconductor devices such as the integrated circuits of microchips, results in extremely small conductive paths or traces. In other words, miniaturization of microchips and more specifically the number of devices that can be housed in a microchip result in path widths less than 0.5 microinches. Currently, the electrical paths or traces have widths of 0.3 microinches. Of course, thinner path widths are contemplated in the future as the drive to further miniaturize integrated circuits continues. The thin conductive paths or traces are also spaced on close centers within a microprocessor or other semiconductor device. The spacing between conductors will also lessen as miniaturization continues. The close spacing makes components more vulnerable to voltage spikes or transients. These transients come in many forms, including a common form caused by an electrostatic buildup of charge on operators or equipment.

Miniaturization of the electrical paths within the components has reached a point where dissipation of static within the device may ruin the circuitry within the device. In devices having line widths less than 0.5 microinches, an electrostatic discharge from a jumper or shunt having 2000 volts of static electricity may cause a failure in the device. The failures take the form of ruined circuits or electromagnetic interference. The electrostatic discharge (ESD) travels through multiple coupling paths, which include circuits, grounds, and transient electromagnetic fields. An electrostatic discharge event starts with a very slow buildup of energy, often taking tens of seconds, followed by a very rapid breakdown.

Microprocessors with narrow line widths may not function after an ESD event. Many times the excessive voltage ruins the circuit. One solution to the problem has been to provide the circuit with filters capable of withstanding an ESD event. The filters pass ESD spikes to ground or absorb the ESD spike before it damages the circuit. Adding filters is contrary to miniaturization of semiconductor devices. Filters and the related connectors require space. The use of filters also adds to the cost of the semiconductor devices or components. Adding filters increases the complexity of circuit design. Increased complexity also makes incorporating changes to a circuit more difficult.

Another device that is ESD sensitive is magnetoresistive (MR) heads. MR heads are commonly used in devices that record data magnetically, such as a disc drive or a tape drive. An electrostatic discharge occurring between an MR head and another electrical component will, more than likely, ruin the head. In each disc drive or tape drive, typically there are a number of MR heads.

During the manufacture of any device having sensitive electrical devices, there are opportunities for an ESD event. For example, when manufacturing a disc drive, there are many times when ESD sensitive electronic parts are assembled and handled. One example is during the assembly of the actuator assembly. While manufacturing the actuator assembly, it is handled and tested several times.

Yet another problem associated with electrically sensitive devices is an electrical overstress (EOS). Many in the electronics industry use the acronyms ESD and EOS interchangeably. However, ESD is a specific subset of EOS, and is generally considered a handling and packaging problem. Electrical overstress (EOS) is a broad definition encompassing many potential sources and failure modes. There are two types of failures: catastrophic, which can usually be identified by testing prior to shipment, and latent, which is a malfunction caused by electrical overstress occurring during normal operation. Latent electrical overstress does not cause catastrophic failure, but is severe enough to actually weaken the part, diminishing the life of the assembly. Latent electrical overstress is currently a larger concern for device failures than ESD.

For example, an integrated circuit (IC) has three primary failure modes: metal burnout, junction shorts, and dielectric breakdown. Excessive current in the IC, which heats the metal through resistance heating, causes all three failures. Voltages exceeding the specific breakdown level of the gate oxide send current through the oxide, damaging metal oxide semiconductors (MOS). Any amount of current in the oxide causes sufficient heating to cause damage. This type of voltage sensitivity has resulted in "on chip" protection for most IC's that use MOS technology.

One way to avoid ESD and to lessen the possibility of EOS, is to place the shunts on circuits in an ionized environment. In the ionized environment, the static charges are dissipated. This solution is fine for a factory; however, many of the users do not have access to such an environment.

Many users are placing shunts on circuits in a home or work environment so this is less than optimal solution. Most shunts are soldered or hardwired to the electrical leads on the electrical device. Removing such shunts can be time consuming if the leads to which the shunt is attached must be maintained. Removal requires desoldering the connection between the lead and the shunt. The removal of solder or desoldering may also lead to electrical overstress and a latent defect. These takes time and may cause the leads to fail. In instances where keeping the leads is not critical, the leads and the shunt are mechanically removed. Once removed, the leads can not be used for testing the part for example.

What is needed is a method and apparatus, which prevents an ESD event or lessens the severity of an ESD event resulting from placing a jumper or shunt onto a circuit which, includes microprocessors or microchips. If the ESD event can be prevented or lessened, then failures in microchips having thin traces will be prevented or much less likely to occur. What is also needed is a device, which can be used to lessen or avoid the effects of EOS. What is also needed is a shunt which can be used in a home or work environment without resulting in a failed circuit. Still further what is needed is a shunt that can be placed across the leads of an electrically sensitive device and which will stay in place. In addition, what is needed is a shunt that can be easily removed without destroying electrical leads so that a part may be shunted to prevent electrostatic discharge during one phase of manufacture and which can be electrically tested using the electrical contacts which were previously shunted at a different time in the manufacturing process.

SUMMARY OF THE INVENTION

A method for placing several electrical portions of an electrical component at substantially the same electrical potential includes identifying electrical conductors which lead to a first electrical portion and separate electrical conductors which lead to a second electrical portion indium metal is placed across the leads of the first electrical portion and the leads of the second electrical portion. An indium metal wire may be placed across the leads of the first electrical portion and the leads of the second electrical portion. A sheet of indium metal foil may also be placed across the leads of the first electrical portion and the leads of the second electrical portion. The indium metal, in either the wire form or the sheet form, is pressed across the leads of the first electrical portion and the leads of the second electrical portion. The indium metal material may also be across the bonding pads of the first electrical portion and the bonding pads of the second electrical portion.

A method for preventing electrostatic discharge between a first electrical portion of a device and a second electrical portion of a includes locating an electrical contact coupled to a first electrical portion, and locating an electrical contact coupled to a second electrical portion. An indium metal is placed onto the electrical contact coupled with the first electrical portion and onto the electrical contact coupled to the second electrical portion. Placing the indium metal onto the electrical contacts includes pressing the indium metal onto the electrical contact coupled with the first electrical portion and onto the electrical contact coupled to the second electrical portion to form a solderless contact. The method also includes removing the indium metal from the first electrical contact and the second electrical contact; and reusing the indium metal. Removing the indium metal may be done by using a static disappative mechanical apparatus, such as a tweezers. Reusing the indium metal includes ascertaining the amount of deformation the indium metal underwent as a result of a previous use, and pressing the indium metal onto another set of contacts on another device. Generally, the indium metal is pressed onto the electrical contact coupled with the first electrical portion and onto the electrical contact coupled to the second electrical portion to form a shunt contact. After removing the indium metal from the first electrical contact and the second electrical contact, the first electrical contact and the second electrical contact can be used again for any purpose, such as testing the electrical contacts. The first electrical contact may be a test probe and the second electrical contact may also be a test probe.

Advantageously, the above described method and apparatus prevents ESD events or lessens the severity of ESD events during the manufacture or handling to electrically sensitive parts during manufacture or other reconfiguration. Preventing or lessening the possibility of an ESD event lessens the number of failures in microchips or other electrically sensitive devices. This lessens the need for rework or scrapping devices altogether. This also streamlines manufacturing since the devices being built do not have to be sidelined for rework. The shunt can be used in a home or work environment without resulting in a failed circuit. The shunt can also be placed across the leads of an electrically sensitive device and will stay in place. The shunt can also be easily removed without destroying electrical leads so that a part may be shunted to prevent electrostatic discharge during one phase of manufacture and the leads can be reused for electrical testing. In other words, the electrical contacts which were previously shunted during manufacture can now be reused at a different time in the manufacturing process or when performing field upgrades. The shunts will also lessen the occurrence of an electrical overstress event.

DESCRIPTION OF THE PREFERRED EMBODIMENT

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

The invention described in this application is useful with all electrical devices having a number of electrical contacts. For example, the invention is useful for printed circuit boards, which have a number of electrical contacts that may need to be shunted or connected together in order to protect electrically sensitive components attached to the circuit board. The invention may also be useful in shunting or electrically connecting wires or electrical pads of devices that may have electrically sensitive components. For example, in a disc drive there typically are one or more head suspension assemblies, which include an MR ("magnetoresistive") head. The MR head is extremely sensitive to electrostatic discharge or to electrical overstress. For example, one type of MR head, termed a giant MR (GMR) head, is extremely sensitive to ESD/ESO. ESD/ESO of less than 10 volts may result in failure or a latent failure. This is much more sensitive than most semiconductor devices. If an electrostatic charge is formed between two leads to an MR head, and an electrostatic discharge occurs between the two leads or if an electrical overstress situation is introduced into the part with the MR head, then an MR head may be ruined. As a result, there is a need for a device that can electrically couple the individual leads to an MR or GMR head as well as a device that can be used to electrically couple the leads of a plurality of MR heads. The invention is useful for placing any number of leads, contact pads or electrical contact pads in communication with one another.

A disc drive 100 is a device that includes a number of electrically sensitive devices. The invention will be described with respect to a disc drive 100, and also with respect to some of the subassemblies that are used to form a disc drive. It should be noted that although this invention is described with respect to a disc drive, the invention is widely applicable to any electrical device where it may be useful to shunt or connect together at least two electrical contacts.

Figure 1:
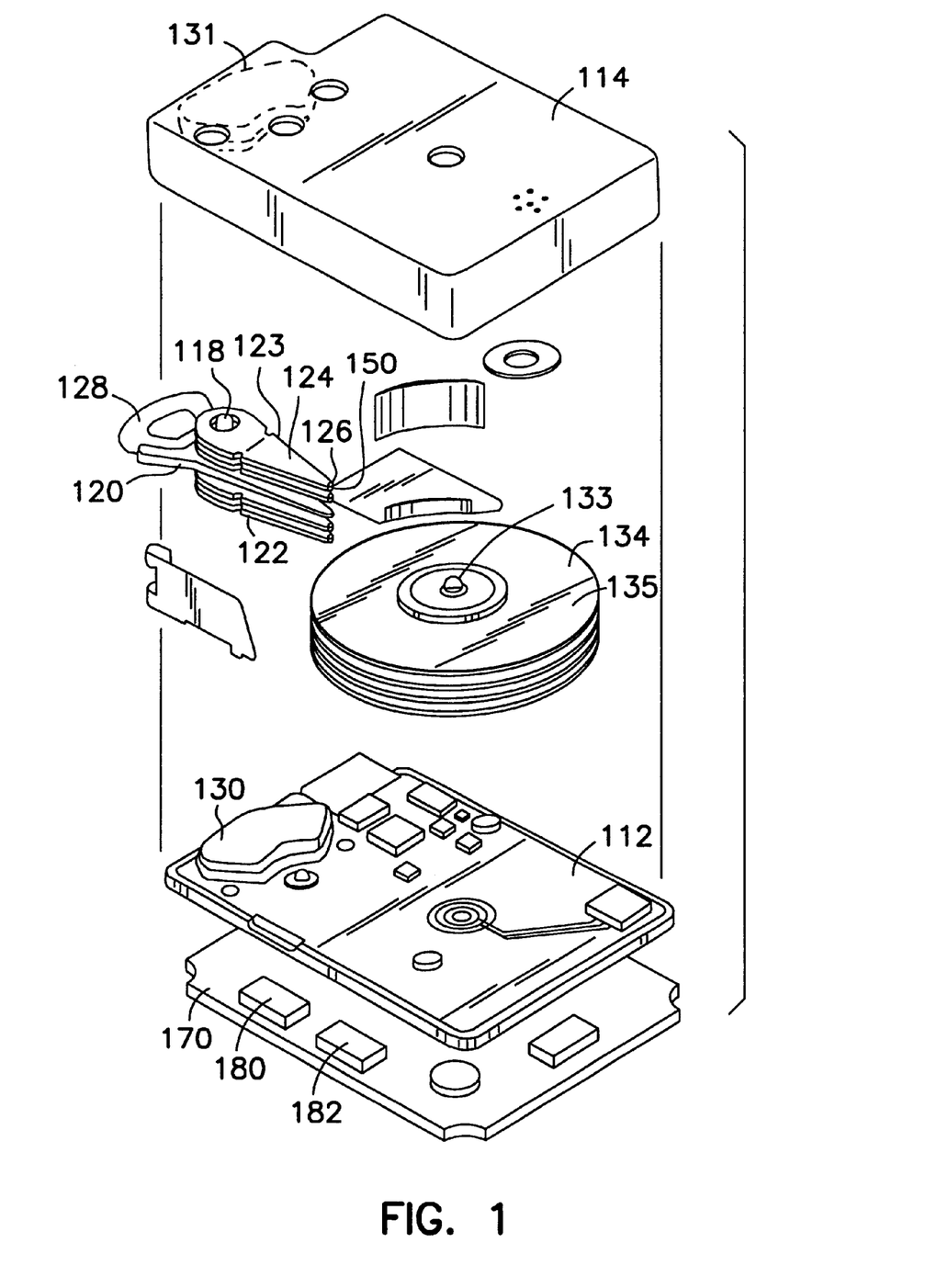
FIG. 1 is an exploded view of a disc drive with a multiple disc stack.

FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 that carries at least one magnetic transducer 150. One of the elements of the transducer 150 can be a magnetoresistive ("MR") element that is generally used as a read element. As noted above, MR elements are extremely sensitive to an electrostatic discharge events. An MR element many times is ruined by an electrostatic discharge event. The slider 126 with the transducer 150 form what is many times called the head. It should be noted that many sliders have one transducer 150 and that is what is shown in the figures. It should also be noted that this invention is equally applicable to disc drives having a single sensitive electrical element, such as the MR element, or multiple sensitive electrical elements.

On the end of the actuator arm assembly 120 opposite the load springs 124 and the sliders 126 is a voice coil 128. Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor, which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors, which are within the hub 133 or under the hub.

The disc drive also includes a printed circuit card 170 that is attached to the base 112 of the disc drive 100. The printed circuit card 170 includes a controller 180 and random access memory 182 that controls various aspects of the disc drive 100. The controller 180 and the random access memory 182 are two components on the printed circuit card 170 that also are sensitive and may be ruined by an electrostatic discharge event.

Figure 2:
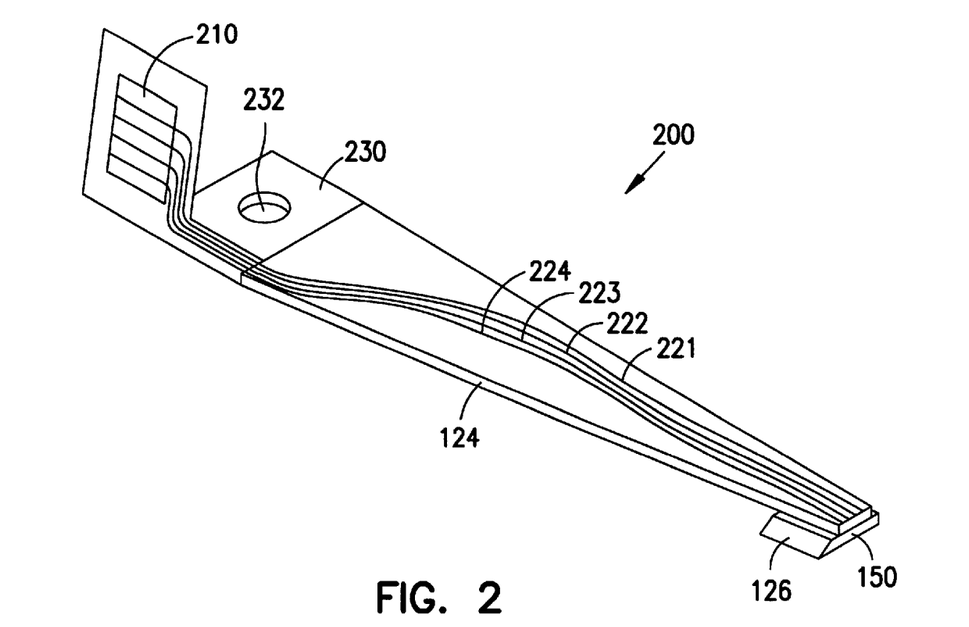
FIG. 2 is a perspective view of a head suspension assembly, which includes a window for holding lead wires attached to a magneto resistive element and a thin film element of a transducer.

FIG. 2 is a perspective view of a head suspension assembly 200 which includes a window 210 for holding lead wires 221, 222, 223, 224 two of which are attached to a magneto resistive head and two of which are attached to a thin film head of the transducer 150. The head suspension assembly 200 is one subassembly of a disc drive 100. Another subassembly includes a number of head suspension assemblies 200, which are generally stacked or ganged and used, with other head suspension assemblies 200 to populate the arms 123 of the actuator assembly 120. The head suspension assembly 200 also includes a swage plate 230 having a swage opening 232. The load beam or load spring 124 is attached to the swage plate 230. Some suspended heads 200 do not include a swage plate 230.

Individual head suspension assemblies 200 are typically tested before being attached to the arms 123 of an actuator assembly 120. This assures that each of the head suspension assembly 200 will be good or pass the test indicating that the individual head suspension assemblies 200 have not failed. When the individual head suspension assembly pass the test they then can be used to form a large or more expansive subassembly by adding a number of good head suspension assembly 200 to the arms 123 of the actuator assembly 120. As mentioned previously the MR element of the transducer 150 is extremely sensitive to electrostatic discharge activity. As a result it is imperative that all the leads 221, 222, 223, 224 are maintained at the same electrical potential. If the leads 221, 222, 223, 224 are all maintained at the same electrical potential the possibility for an electrostatic discharge event is significantly reduced.

Figure 3:
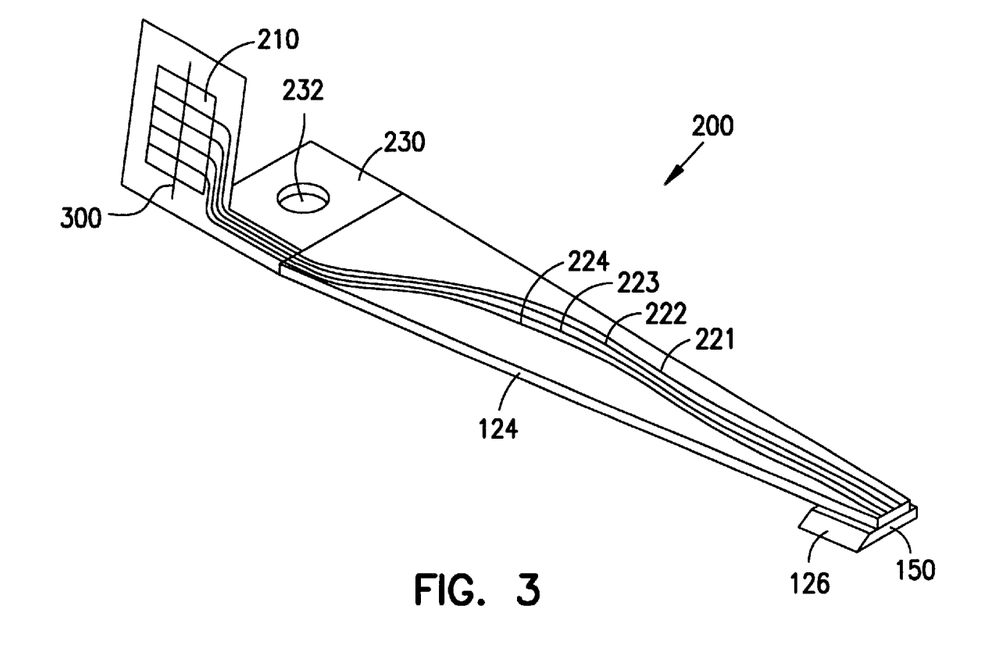
FIG. 3 is a perspective view of a head suspension assembly which includes a window for holding lead wires attached to a magneto resistive head which are shunted using an indium foil material.

FIG. 3 is a perspective view of the head suspension assembly 200 which includes a window 210 for holding lead wires 221, 222, 223, 224 attached to the magneto resistive head and to a thin film head of the transducer 150 in which the lead wires 221, 222, 223, 224 are shunted or attached with a shunt 300 across the window 210. The shunt 300 is made of indium. The shunt in FIG. 3, the indium shunt 300 is in the form of a wire. The indium shunt 300 is placed across the window 210 and across the leads 221, 222, 223, 224 using a static disappative tweezers (not shown) or other similar mechanical apparatus. The indium material conforms to the lead wires 221, 222, 223, 224 and can be pressed on to form the shunt. In other words the indium of the shunt 300 is easily deformed in the plastic region. The shunt 300 can be placed across the leads 221, 222, 223, 224 whenever the head suspension assembly 200 is to be transported or otherwise handled. Because the indium is formable or conformable or plastically deformable the shunt can be placed onto the leads 221, 222, 223, 224 without requiring soldering of the shunt to the leads. The indium, when pressed onto the leads 221, 222, 223, 224 makes electrical contact between all of the leads. In addition, the indium has a tacky feel at room temperature or environments where shunting is to be accomplished. Thus, the indium shunt will stay in place without soldering. Once the shunt 300 is in place, the head suspension assembly 200 can be transported or tested. Once the transportation or testing is complete, the shunt 300 made of indium is simply removed by pulling or removing the shunt 300 from the leads 221, 222, 223, 224. The result is that the shunt 300 is easy to place across the leads as well as to remove from the leads. Several advantages are gained from using an indium shunt 300. First of all since the shunt can be pressed onto the leads and to make an electrical connection without soldering and furthermore since unshunting really means removing the shunt 300, the turn around for testing or transportation is increased when compared to other shunts which must be soldered to the leads. Removal of the shunt 300 in prior art devices would require cutting off the leads before the point where the shunt is attached. Thus another of the advantages is that by using the indium shunt 300, the leads 221, 222, 223, 224 will not have to be shortened when a new electrical component is introduced.

Figure 4:
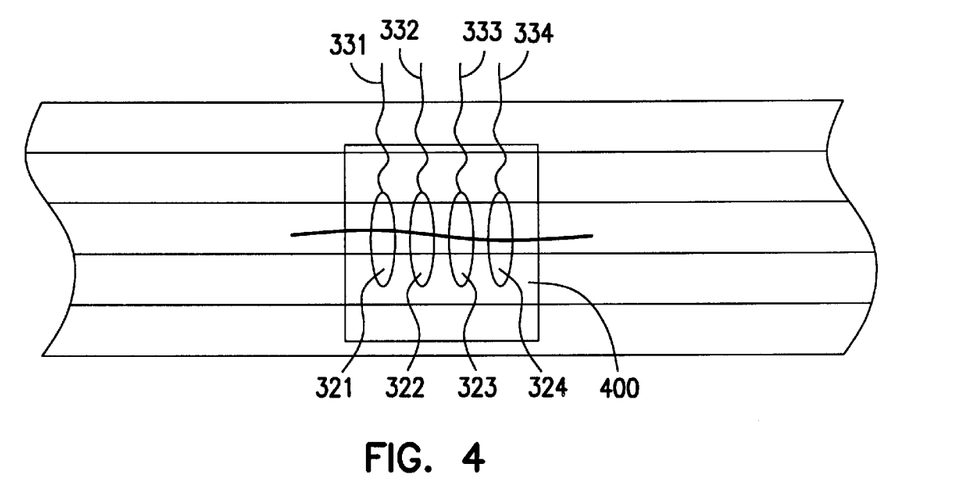
FIG. 4 is a top view of a paddleboard having several electrical contact points or bonding pads shunted using an indium wire.

FIG. 4 is a top view of a paddleboard 400 having several electrical contact points 321, 322, 323, and 324. A lead or leads 331, 332, 333, 334 are attached to the contact points 321, 322, 323, and 324. The leads 331, 332, 333, and 334 can be attached to any electrically sensitive component, not necessarily to a MR element as described in FIGS. 2 and 3. A paddleboard is typically a PC board or a smaller PC board which concludes electrical contact points. The paddleboard can be used to connect the leads from a plurality of head gimble assembly 200. A paddleboard 400 can also be used for other devices, as mentioned previously. An indium shunt 300 is placed across the electrical contact pads 321, 322, 323, 324 so that each of the electrical contact pads remains at the same potential. When the electrical contact pads 321, 322, 323, 324 are all of the same electrical potential there is less chance for an ESD event causing a difference in potential between two of the leads therefore resulting in an electrostatic discharge which would or could ruin one of the sensitive components attached. In some disc drives, there may be no paddleboard. In some disc drives, suspension traces are placed directly on the load beam or load spring. This is called tracer suspension assembly (TSA). In other disc drives, a flex cable is used to electrically attach the head 150 to the disc drive electronics. The flex cable may be directly attached to the surface of the load beam or load spring. This is termed flex on suspension (FOS). When TSA or FOS is used, electrical contacts, which can be connected using the inventive shunt, are presented.

Figure 5:
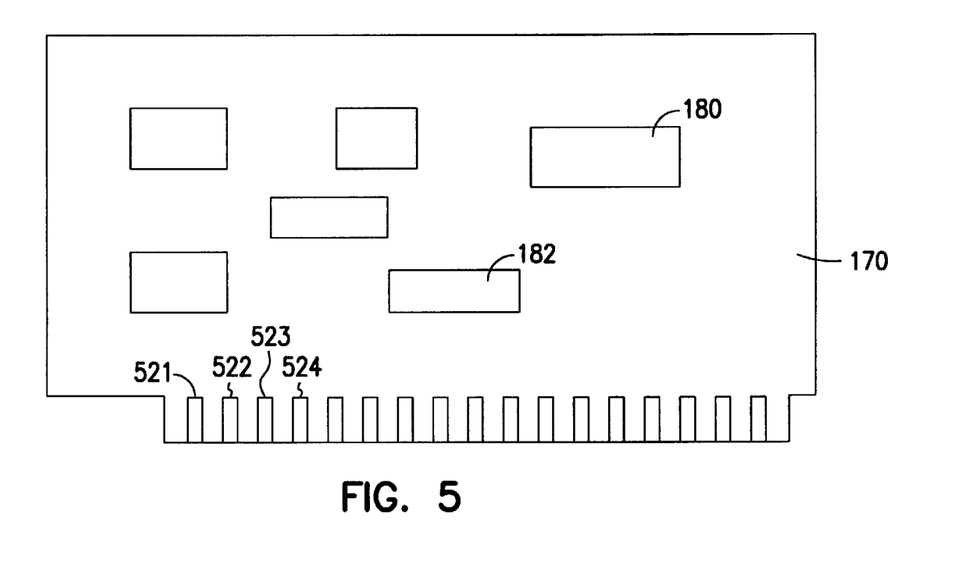
FIG. 5 is a top view of a printed circuit board having a plurality of electrical contact areas.

FIG. 5 is a top view of a printed circuit board 170 having a plurality of electrical contact areas 521, 522, 523, 524. There is a plurality of electrical contact points shown on the printed circuit board 170 in FIG. 5 although only four are numbered for the sake of brevity. The electrical contact pads 521, 522, 523, 524 may be attached to one or more of the electrically sensitive devices attached to the circuit card 170. For example, the electrical contact pads are typically in electrical communication with the controller 180 as well as with the random access memory 182. As a result, an electrical static discharge between one or more of the contact pads represented by reference number 521, 522, 523, 524 could result in damage of the electrically sensitive components such as elements 180 and 182 in FIG. 5.

Figure 6:
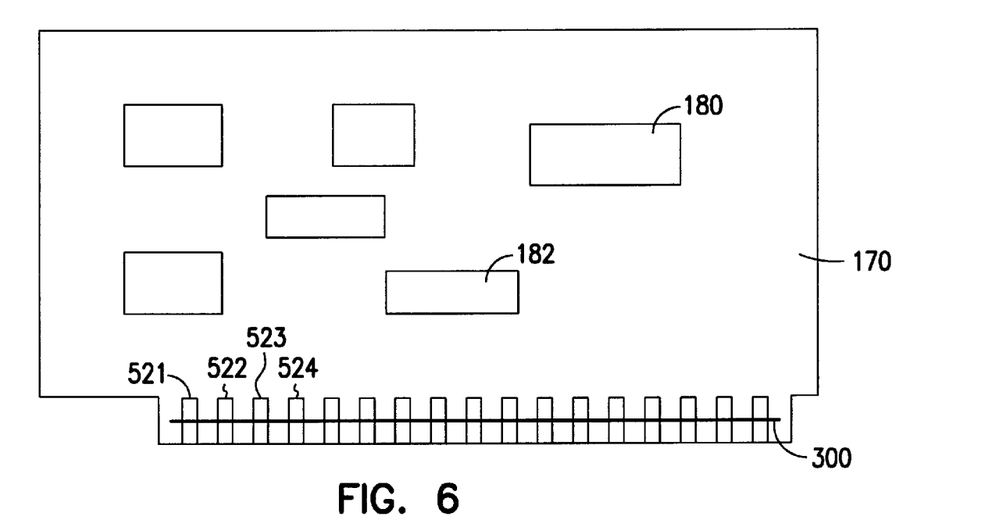
FIG. 6 is a top view of a printed circuit board having a plurality of electrical contact areas connected using a wire of indium.

Now turning to PIG. 6 which is a top view of the printed circuit card 170 having a plurality of electrical contact to areas represented by 521, 522, 523, 524 connected using a wire of indium 300. This wire of indium 300 is also a shunt 300. By placing a shunt across the leads the possibility for electrostatic discharge ruining the onboard parts or devices upon the printed circuit board 170 are significantly less. As mentioned previously the shunt can be pressed onto the contact pad 521, 522, 523, 524 and merely remove from the contact pads 521, 522, 523, 524. It should also be noted that even though the shunt 300 shown in FIG. 6 is long enough to pass over all the electrical contact pads at the edge of the circuit board 170 it should be appreciated that a shortened shunt 300 can be used to connect less than all of the electrical contact point pads on any device. It is also advantageous in that the indium wire can be merely removed from the printed circuit board without having to clip or remove a portion of the printed circuit board. It should also be noted that the shunting material or indium wire 300 can be reused. After removing the shunt 300 from the contact pads 521, 522, 523, 524, the shunt 300 is inspected to determine if it is reusable. If the shunt 300 has been deformed too much, the shunt 300 will not be used again. However, if the shunt 300 is in sufficient shape such that it can be used again as a shunt and pressed into the electrical contact pads or leads then the shunt is reused. Thus, another advantage is that the shunt 300 is reusable. In addition, use of the shunt is quick since no soldering is required in order to make and keep electrical connections between various contact pads on any type of sensitive electrical device.

Figure 7:
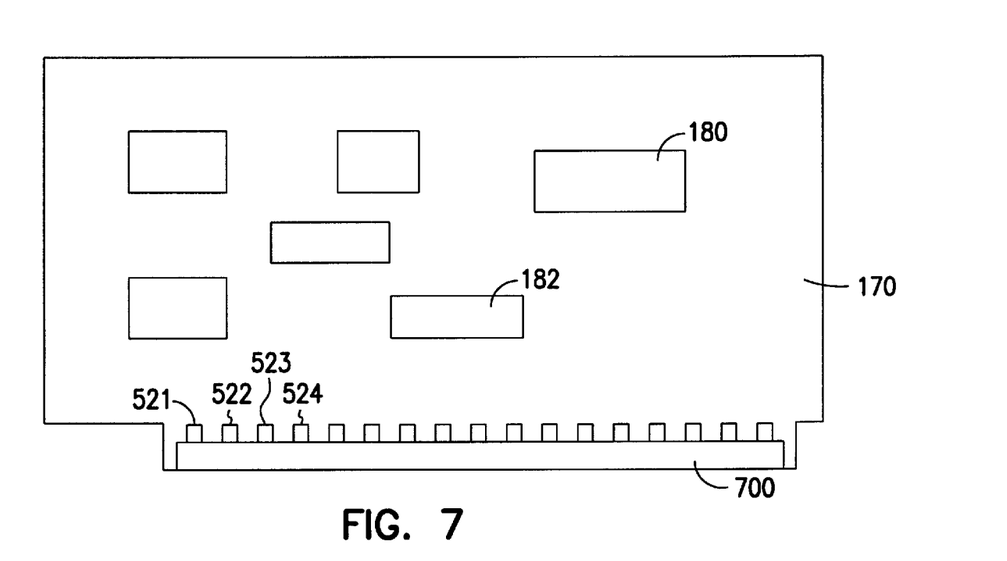
FIG. 7 is a top view of a printed circuit board having a plurality of electrical contact areas connected using indium foil.

FIG. 7 is a top view of a printed circuit board 170 having a plurality of contact areas represented by 521, 522, 523, 524 which are connected using a foil material 700 made of indium. The foil material 700 has similar or the same advantages as the wire indium shunting material. FIG. 7 merely shows that the foil material 700 can also be used as a shunt with all the advantages set forth above that are associated with indium wire shunts 300.

Figure 8:
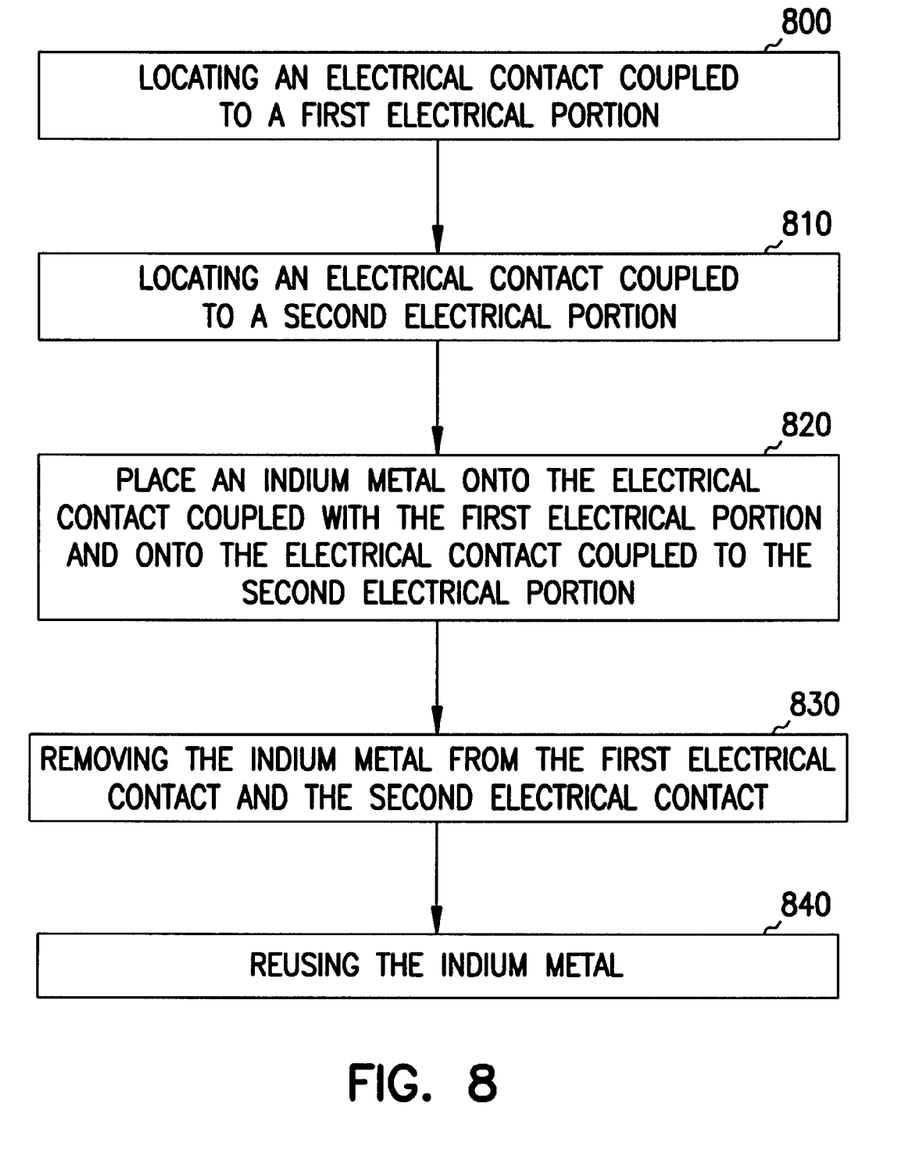
FIG. 8 is a flow diagram showing a number of steps for reusing the indium shunting material.

FIG. 8 is a flow diagram showing a number of steps for reusing any sort of indium shunting material including indium wire 300 or indium foil 700. The initial step 610 includes locating a first electrical contact associated with the first electrical portion. The second step depicted by reference numeral 810 is to locate an electrical contact coupled to a second electrical portion. The third step in the method includes placing an indium metal material onto the first electrical contact and onto the second electrical contact with each of which are associated with a first electrical portion and a second electrical portion, respectively. This step is denoted by the reference numeral 820. After testing has been completed or after transportation has been achieved the indium metal material or shunting device 300 or 700, is removed from the first electrical contact and the second electrical contact, as depicted by reference numeral 830. The indium material 300, 700 is then inspected and reused if it is felt that the indium material 300, 700 may still be effective as a shunt 300. This step is depicted by reference numeral 840.

Advantageously, the above described method and apparatus prevents ESD events or lessens the severity of ESD events during the manufacture or handling to electrically sensitive parts during manufacture or other reconfiguration. Preventing or lessening the possibility of an ESD event lessens the number of failures in microchips or other electrically sensitive devices. This lessens the need for rework or scrapping devices altogether. This also streamlines manufacturing since the devices being built do not have to be sidelined for rework. The shunt can be used in a home or work environment without resulting in a failed circuit. The shunt can also be placed across the leads of an electrically sensitive device and will stay in place. The shunt can also be easily removed without destroying electrical leads so that a part may be shunted to prevent electrostatic discharge during one phase of manufacture and the leads can be reused for electrical testing. In other words, the electrical contacts which were previously shunted during manufacture can now be reused at a different time in the manufacturing process or when performing field upgrades.

Figure 9:
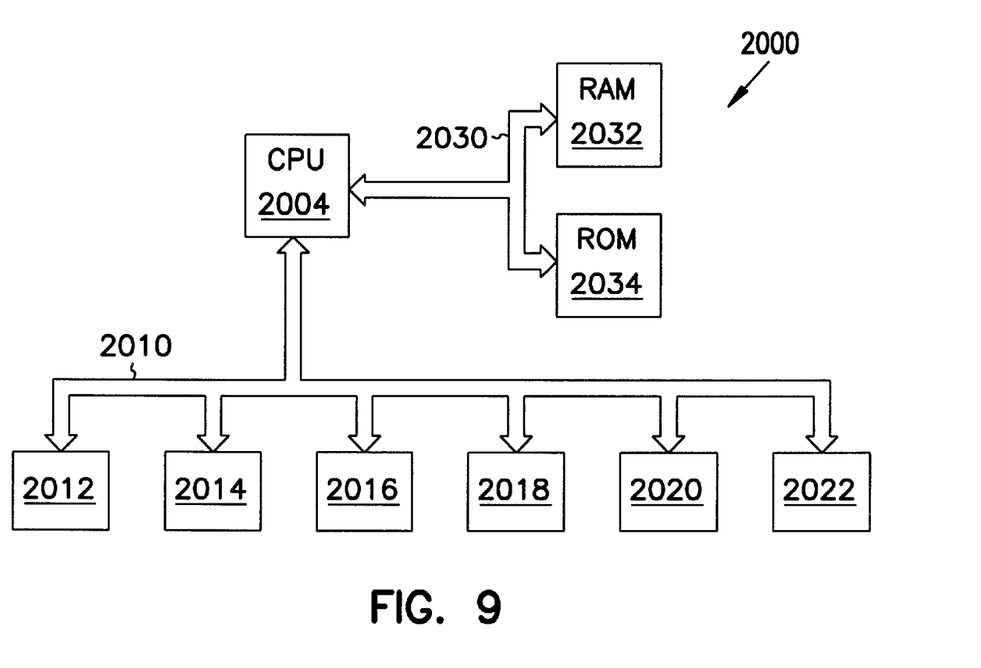
FIG. 9 is a schematic view of a computer system.

FIG. 9 is a schematic view of a computer system. Advantageously, the invention is well suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

In conclusion, a method for placing several electrical portions 221, 222, 223, 224, 321, 322, 323, 324, 521, 522, 523, 524, of an electrical component 100, 170, 200 at substantially the same electrical potential includes identifying electrical conductors 221, 321, 521 which lead to a first electrical portion and separate electrical conductors 222, 322, 522 which lead to a second electrical portion. Indium metal 300, 700 is placed across the leads 221, 321, 521 of the first electrical portion and the leads 222, 322, 522 of the second electrical portion. An indium metal wire 300 may be placed across the leads 221, 321, 521 of the first electrical portion and the 222, 322, 522 of the second electrical portion. A sheet of indium metal foil 700 may also be placed across the leads 221, 321, 521 of the first electrical portion and the leads 222, 322, 522 of the second electrical portion. The indium metal 300, 700, in either the wire form 300 or the sheet form 700, is pressed across the leads 221, 321, 521 of the first electrical portion and the leads 222, 322, 522 of the second electrical portion. The indium metal material 300, 700 may also be across the bonding pads 221, 321, 521 of the first electrical portion and the bonding pads 222, 322, 522 of the second electrical portion.

A method for preventing electrostatic discharge between a first electrical portion 221, 321, 521 of a device and a second electrical portion 222, 322, 522 of a includes locating an electrical contact coupled to a first electrical portion 800, and locating an electrical contact coupled to a second electrical portion 810. An indium metal 300, 700 is placed onto the electrical contact coupled with the first electrical portion and onto the electrical contact coupled to the second electrical portion 820. Placing the indium metal 300, 700 onto the electrical contacts portions 221, 222, 223, 224, 321, 322, 323, 324, 521, 522, 523, 524, includes pressing the indium metal onto the electrical contact coupled with the first electrical portion 221, 321, 521 and onto the electrical contact coupled to the second electrical portion 221, 321, 521 to form a solderless contact. The method also includes removing the indium metal 300, 700 from the first electrical contact and the second electrical contact 830; and reusing the indium metal 840. Removing the indium metal 830 may be done by using a static disappative mechanical apparatus, such as a tweezers. Reusing the indium metal 840 includes ascertaining the amount of deformation the indium metal 300, 700 underwent as a result of a previous use, and pressing the indium metal 300, 700 onto another set of contacts on another device. Generally, the indium metal 300, 700 is pressed onto the electrical contact coupled with the first electrical portion 221, 321, 521 and onto the electrical contact coupled to the second electrical portion 222, 322, 522 to form a shunt contact. After removing the indium metal 300, 700 from the first electrical contact 221, 321, 521 and the second electrical contact 222, 322, 522, the first electrical contact and the second electrical contact can be used again for any purpose, such as testing the electrical contacts. The first electrical contact may be a test probe and the second electrical contact may also be a test probe.

Most generally, a device for providing an electrical shunt on a device includes a conformable metal means. A shunt apparatus includes indium metal adapted to contact electrical contacts of an electrical device 100, 170, 200. Indium metal 300, 700 is doped in one embodiment. The shunt apparatus is a wire of metal including indium or metal foil including indium.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for preventing electrostatic discharge between a first electrical portion of a device and a second electrical portion of a device comprising steps of:

(a) locating an electrical contact coupled to a first electrical portion;

(b) locating an electrical contact coupled to a second electrical portion; and (c) placing an indium metal onto the electrical contact coupled with the first electrical portion and onto the electrical contact coupled to the second electrical portion, the indium metal plastically deforming to conform to the first electrical portion and the second electrical portion.

2. The method of claim 1 where the placing step (c) includes pressing the indium metal onto the electrical contact coupled with the first electrical portion and onto the electrical contact coupled to the second electrical portion to form a solderless contact.

3. The method of claim 1 further comprising steps of:

(d) removing the indium metal from the first electrical contact and the second electrical contact; and (e) reusing the indium metal.

4. The method of claim 3 wherein the removing step (d) includes removing the indium metal using a static disappative mechanical apparatus.

5. The method of claim 3 the removing step (d) includes removing the indium metal using a static disappative tweezers.

6. The method of claim 3 where the reusing step (e) further comprises steps of:

(d) ascertaining the amount of deformation the indium metal underwent; and (e) pressing the indium metal onto another set of contacts on another device.

7. The method of claim 1 where the placing step (c) includes pressing the indium metal onto the electrical contact coupled with the first electrical portion and onto the electrical contact coupled to the second electrical portion to form a shunt contact.

8. The method of claim 1 further comprising steps of:
   (d) removing the indium metal from the first electrical contact and the second electrical contact; and
   (e) using the first electrical contact and the second electrical contact after the indium metal has been removed.

9. The method of claim 8 wherein the first electrical contact is a test probe and the second electrical contact is a test probe.

10. A shunt apparatus comprising indium metal adapted to contact electrical contacts of an electrical device.

11. The shunt apparatus of claim 10 wherein the indium metal is doped.

12. The shunt apparatus of claim 10 wherein the shunt apparatus is a wire of metal including indium.

13. The shunt apparatus of claim 10 wherein the shunt apparatus is metal foil including indium.

* * * * *